July 1, 1930.  W. W. TANCRÉ  1,769,401
FRUIT CLIPPER
Filed April 23, 1928
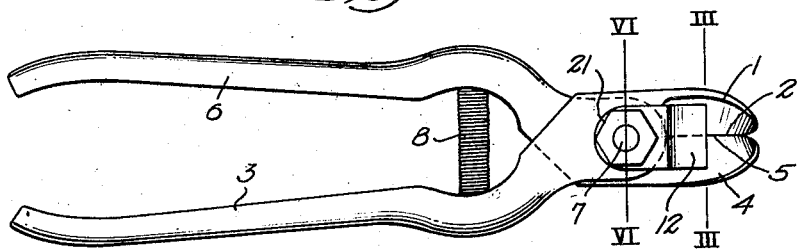
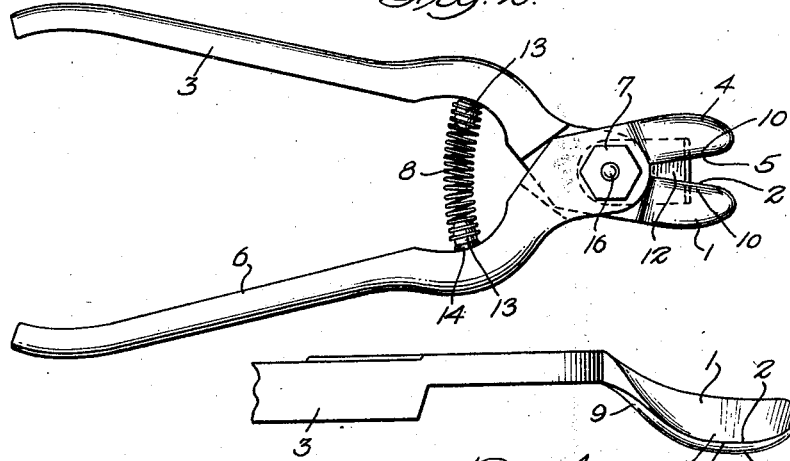
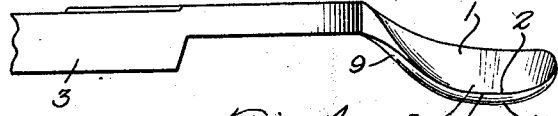
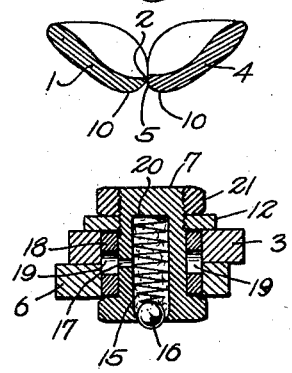
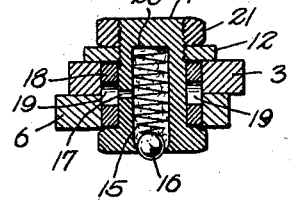
INVENTOR.
WILLIAM W. TANCRÉ.
BY Low Low
ATTORNEYS.

Patented July 1, 1930

1,769,401

UNITED STATES PATENT OFFICE

WILLIAM W. TANCRÉ, OF SAN DIEGO, CALIFORNIA

FRUIT CLIPPER

Application filed April 23, 1928. Serial No. 272,294.

My invention relates to clippers for harvesting citrous fruits, such as oranges, lemons, grape fruit, etc., by cutting the stems by which the fruit is suspended from the tree. These implements are subject to rapid deterioration from the orange oil and sprayed chemicals. Though great numbers of this class of clippers are in use, they are not properly designed and constructed for the best results or to prevent injury to the fruit in the harvesting or clipping operation. If so injured, though the defect appears to be slight, the fruit is not suitable for washing and packing because of the quick decay which follows. The stem to be cut off is ordinarily located in a depression in the end of the orange and has at its base a growth called the button. Four principal injuries may be mentioned: the point of one of the clipper blades or jaws penetrates the skin of the orange; or in closing the blades they clip an incision in the skin, or cut off a bit of the skin; or, in avoiding the above injuries, the stem is cut too long; or in avoiding the latter the button of the orange is cut out. In the first two and last cases the fruit rapidly decays; in the third case the projecting stiff stem will puncture or abrade the skin of many other oranges as they are handled in bulk in washing and packing.

The proper harvesting of oranges, to avoid large losses, is therefore difficult, yet it must be done with all the rapidity possible to avoid undue labor expense.

My invention has for its object, by making certain small but very important changes in the clipping implements now known and used, to make the clipper in most cases proof against unskillful use. Also to make it more durable by lengthening the time of its efficiency for such work.

My improvements relate to the shaping of the clipper blades, as will be explained.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements in their useful applications, to the particular constructions which, for the purpose of explanation, have been made the subject of illustration.

In the said drawings:—

Fig. 1 is a plan view of the top of a clipper embodying my invention with the blades closed.

Fig. 2 is a similar view of the bottom of the clipper with the blades open.

Fig. 3 is a cross-section enlarged of the closed blades on line III—III of Fig. 1.

Fig. 4 is an edge view enlarged of one of the blades.

Fig. 5 is an edge view enlarged of the other blade.

Fig. 6 is a cross-section enlarged at the pivot point on line VI—VI of Fig. 1.

Referring to the drawings, 1 indicates a jaw having a sharp cutting edge 2 and handle 3, and 4 a jaw having a face 5 against which the edge 2 may press and fit with a cutting action, and having a handle 6. These elements are connected by the pivot 7 and the handles and jaws are pressed apart by the spring 8. It will be understood that the cutting elements 2 and 5 do not shear past each other but oppose and bear against each other at the cutting plane. These jaws cannot be spread apart and be displaced by a stem pinched between their sides. If the blades wear a little loose on their pivot the edge 2 will nevertheless meet and cut against some part of the face 5, whereas two opposing edges like the edge 2 would not operate efficiently unless exactly in line with each other. In order that said jaws may enter the cup of an orange, said cup being the depression which usually surrounds the stem, sufficiently to clip the stem at the button thereof, said jaws are curved downward as shown at 9 in Figs. 4 and 5.

The cutting edge 2 and opposing face 5 have a similar contour. In order that the jaws may be incapable of cutting out the button or of clipping the skin of the orange the under parts of the jaws are rounded upward to the edge 2 and face 5 respectively as shown at 10 in Fig. 3. The downward curvature of the clipping or lowermost portions 2 and 5 would however make a concave cut across the fruit stem and the upstanding edges of the stem, becoming relatively dry and hard, would in some cases puncture other oranges or fruit and cause them to decay, and I make said clipping parts, or the edge 2 alone, straight or horizontal as shown at 11 in Fig. 4.

12 is a stop carried by the bolt or pivot 7 and preferably screwed thereon, to bear against the stem of the fruit when the clipper is in position for clipping said stem. This stop may be in one piece with one of the jaws, or attached thereto otherwise than by said pivot. The ends of the coiled spring 8 fit over projections 13 on the inner sides of the handles, and the end coils are contracted into grooves 14 at the bases of said projections to keep the spring in place and the handles 3 and 6 from being unduly separated. The clipper elements 1, 3 and 4, 6 are preferably drop forgings, hardened. The pivot 7 is preferably formed with a recess or bore 20 containing a spring 15 and ball 16. The ball closes the outer end of the recess when pressed outward by said spring. It can be forced inward by the nozzle of an oiler to inject a charge of lubricating oil. This oil will saturate a wick to be placed in the recess before the ball is secured, and said oil will escape gradually into the pivot bearing through a lateral hole 17. Around the bolt 7 is fitted a sleeve 18 of relatively soft metal such as phosphor-bronze. This sleeve is formed with a radial hole 19 through which oil may escape to the outside of the sleeve, and the jaw and handle elements fit and turn on said sleeve in the clipping operation. The ball 16 is secured by peening or spinning slightly inward the outer margin of the bore 20 after the wick and ball have been inserted.

If the handles are slightly loose on the pivot 7 the edge 2 will still bear against the face 5 and the clipper will operate efficiently.

At the present time, using the best clippers heretofore known, about two percent of the orange crop is lost by decay of fruit caused by imperfect construction and operation of such clippers, which amounts to a large sum of money. The orange growers of California, shipping 42,000 cars of packed oranges, are subjected to a total loss from said injury to the fruit, of $200 per car.

The clippers sell for from $1.50 to $2.00 each, and the total cost of clippers for a season in California is upwards of $500,000. The clippers now known have a life, in use, of from two to five weeks, on account of deterioration by orange oil and chemicals which they encounter and faulty design which does not resist such impairment. Clippers made according to my invention are estimated to last for a full season, with possible renewal of the bushing at a cost of five cents.

21 is a nut screwed on the end of the pivot and forming a locking nut to cooperate with the stop 12 which is also screwed on said pivot, whereby tight pressure of the nut may be caused on the stop to lock the same after the latter has been adjusted to hold the pivoted elements closely together but free for easy operation.

What I claim is—

1. A clipper for harvesting citrous fruit having in combination two blades pivoted together and having operating handles, said blades extending downward and thence upward to enter into the cup of the fruit around the stem, and meeting each other to cut the stem of the fruit, said blades being rounded up transversely on their under sides to the cutting line and to a height within the depression of the fruit and above the button of the fruit in said depression, which permits cutting the stem short above the button of the fruit and prevents the clipping of the skin of the fruit.

2. A clipper for harvesting citrous fruit having in combination two blades pivoted together and having operating handles, said blades extending downward and thence upward to enter into the cup of the fruit around the stem, and meeting each other to cut the stem of the fruit, said blades being rounded up transversely on their under sides to the cutting line and to a height which necessitates cutting the stem above the button of the fruit and prevents the clipping of the skin of the fruit, one of said blades having a straight cutting portion and the other blade having a suitable opposing portion.

3. A clipper for harvesting citrous fruit having in combination two blades having operating handles and a pivot uniting them, said blades extending downward and thence upward to enter into the cup of the fruit around the stem, and meeting each other to cut the stem of the fruit, said blades being rounded up transversely on their under sides to the cutting line and to a height which necessitates cutting the stem above the button of the fruit and prevents the clipping of the skin of the fruit, the pivot of said blades having a recess containing an absorbent and a spring and a ball closing its outer end, and having a lateral oil passage, and a bushing of relatively soft metal fitting on said pivot and having a lateral oil passage, and fitted in bearings in said blades.

4. A clipper for harvesting citrous fruits, having in combination two blades pivoted together and each blade having an operating handle, said blades extending downwardly and then upwardly, longitudinally, to form cup-shaped blades adapted to enter the depression in the fruit around the stem, said blades being rounded up, transversely, to the cutting edges on the under side, said edges contacting at the end of a cutting stroke, any point of contact of the cutting edges lying in a higher plane than the portions of the blade lying adjacent but outwardly from said point, when the plane tangent to said point of contact of the cutting edge is approximately horizontal.

In testimony whereof I affix my signature.

WILLIAM W. TANCRÉ.